US009692685B2

(12) United States Patent
Lee

(10) Patent No.: US 9,692,685 B2
(45) Date of Patent: Jun. 27, 2017

(54) HETEROGENEOUS NETWORK SYSTEM, NETWORK APPARATUS, AND RENDEZVOUS PATH SELECTION METHOD THEREOF

(71) Applicant: Institute For Information Industry, Taipei (TW)

(72) Inventor: Kun Hung Lee, Taipei (TW)

(73) Assignee: Institute For Information Industry, Taipei (TW)

( * ) Notice: Subject to any disclaimer, the term of this patent is extended or adjusted under 35 U.S.C. 154(b) by 120 days.

(21) Appl. No.: 14/834,408

(22) Filed: Aug. 24, 2015

(65) Prior Publication Data

US 2017/0019327 A1 Jan. 19, 2017

(51) Int. Cl.
*H04L 12/721* (2013.01)
*H04W 40/04* (2009.01)

(52) U.S. Cl.
CPC .......... *H04L 45/124* (2013.01); *H04W 40/04* (2013.01)

(58) Field of Classification Search
CPC ... H04L 12/5689; H04L 45/00; H04L 45/123; H04L 45/124; H04L 45/16; H04L 45/24;
(Continued)

(56) References Cited

U.S. PATENT DOCUMENTS 9,288,113 B2    3/2016  Lan et al.
9,374,311 B1 *  6/2016  Zhou ................. H04L 12/28
(Continued)

FOREIGN PATENT DOCUMENTS

CN    102137047 A      7/2011
CN    101616167 B  *   3/2013
CN    103338150 A     10/2013

OTHER PUBLICATIONS

English translation of attached Chinese patent application CN101616167B, retreived from Google Patents on Jan. 27, 2017.*
(Continued)

*Primary Examiner* — Benjamin H Elliott, IV
(74) *Attorney, Agent, or Firm* — Skaar Ulbrich Macari, P.A.

(57) ABSTRACT

A heterogeneous network system, network apparatus, and rendezvous path selection method thereof are provided. The heterogeneous network system includes several partner network apparatuses and a network apparatus. The network apparatus stores at least one weighting table, wherein each weighting table is related to one network service condition. The interface types of the transceiving interfaces of the partner network apparatuses and the network apparatus are not all the same. The network apparatus measures at least one first transmission parameter and receives several second transmission parameters. Each of the first and second transmission parameters is related to transmission between two network apparatuses neighboring each other. The network apparatus enumerates several paths toward a target network apparatus and calculates a path cost corresponding to each of the paths according to one of the weighting table(s) and a portion of the at least one first transmission parameter and the second transmission parameters.

21 Claims, 9 Drawing Sheets

(58) Field of Classification Search
CPC ....... H04L 45/306; H04L 45/54; H04L 45/70;
H04L 43/08; H04L 47/2408; H04L
47/2475; H04L 47/623; H04L 47/803;
H04L 47/808
See application file for complete search history.

(56) References Cited

U.S. PATENT DOCUMENTS

2001/0047423 A1    11/2001  Shao et al.
2002/0080755 A1*    6/2002  Tasman ............... H04L 12/1854
                                                     370/338
2016/0323177 A1*   11/2016  Tung .................... H04L 45/124
2017/0019327 A1*    1/2017  Lee ..................... H04W 40/04

OTHER PUBLICATIONS

Office Action to the corresponding Taiwan Patent Application rendered by the Taiwan Intellectual Property Office (TIPO) on May 26, 2016, 11 pages (including English translation).

* cited by examiner

| Second transmission parameters | First network apparatus | Second network apparatus |
|---|---|---|
| Associated with a transmission from the network apparatus B to the network apparatus A | Network apparatus B | Network apparatus A |
| Associated with a transmission from the network apparatus B to the network apparatus C | Network apparatus B | Network apparatus C |
| Associated with a transmission from the network apparatus B to the network apparatus D | Network apparatus B | Network apparatus D |
| Associated with a transmission from the network apparatus C to the network apparatus A | Network apparatus C | Network apparatus A |
| Associated with a transmission from the network apparatus C to the network apparatus B | Network apparatus C | Network apparatus B |
| Associated with a transmission from the network apparatus C to the network apparatus D | Network apparatus C | Network apparatus D |
| Associated with a transmission from the network apparatus D to the network apparatus B | Network apparatus D | Network apparatus B |
| Associated with a transmission from the network apparatus D to the network apparatus C | Network apparatus D | Network apparatus C |

| Service type | Weight value of the RTT | Weight value of the available bandwidth | Weight value of the QoS |
|---|---|---|---|
| Film | 2 | 3 | 2 |
| Voice | 1 | 4 | 1 |
| Instant game | 3 | 2 | 3 |
| Network browsing | 4 | 3 | 4 |
| E-mail | 5 | 4 | 5 |

| Network property | Weight value of the RTT | Weight value of the available bandwidth | Weight value of the QoS |
|---|---|---|---|
| Ethernet communication standard | 3 | 2 | 1 |
| Wi-Fi communication standard | 1 | 3 | 3 |
| PLC communication standard | 2 | 1 | 3 |

| Type of a source device | Weight value of the RTT | Weight value of the RTT | Weight value of the QoS |
|---|---|---|---|
| Game console | 3 | 2 | 1 |
| TV | 1 | 3 | 3 |
| High-priority device | 2 | 1 | 1 |

FIG. 1F

| Round trip time (RTT) | Available bandwidth | Quality of Service (QoS) |
|---|---|---|
| 1 (0~9 ms) | 8 (0~124 Mbps) | 8 (0) |
| 2 (10~19 ms) | 7 (125~249 Mbps) | 7 (1) |
| 3 (20~29 ms) | 6 (250~374 Mbps) | 6 (2) |
| 4 (30~39 ms) | 5 (375~499 Mbps) | 5 (3) |
| 5 (40~49 ms) | 4 (500~624 Mbps) | 4 (4) |
| 6 (50~59 ms) | 3 (625~749 Mbps) | 3 (5) |
| 7 (60~69 ms) | 2 (750~874 Mbps) | 2 (6) |
| 8 (70~79 ms) | 1 (875~999 Mbps) | 1 (7) |

| Paths | Round trip time (RTT) (weight value=2) | Available bandwidth (weight value=3) | Quality of Service (QoS) (weight value=2) | Path costs |
|---|---|---|---|---|
| A→C | 3 (25 ms) | 4 (500) | 6 (2) | 30 |
| A→B→C | 1 (0.9 ms+3.2 ms=4.1 ms) | 6 (min(310, 360)) | 1 (min(7, 7)) | 22 |
| A→B→D→C | 3 (0.9 ms+25 ms+3 ms=28.9 ms) | 8 (min(310, 100, 300)) | 6 (min(7, 5, 2)) | 42 |

FIG. 1I

HETEROGENEOUS NETWORK SYSTEM, NETWORK APPARATUS, AND RENDEZVOUS PATH SELECTION METHOD THEREOF

PRIORITY

This application claims priority to Taiwan Patent Application No. 104122916 filed on Jul. 15, 2015, which is hereby incorporated by reference in its entirety.

FIELD

The present invention is related to a heterogeneous network system, a network apparatus, and a rendezvous path selection method thereof. More particularly, the heterogeneous network system, the network apparatus and the rendezvous path selection method thereof according to the present invention select a transmission path according to network service conditions, local transmission parameters, and global transmission parameters.

BACKGROUND

As a result of the advancement of network technologies, the network systems of various types and scales have been developed. Small-scale heterogeneous network systems (e.g., home network systems) are just one kind of network system that have experienced rapid development over recent years. A small-scale heterogeneous network system comprises a limited number of network apparatuses, but often comprises various different kinds of network apparatuses (e.g., set top boxes, smart TVs, tablet computers, smartphones, digital video players and notebook computers). Network communication standards supported by these network apparatuses are not all the same (i.e., the interface types of the transceiving interfaces of these network apparatuses are not all the same). For example, it is possible that in a small-scale heterogeneous network system, some network apparatuses have Power Line Communication (PLC) interfaces and Wi-Fi interfaces while other network apparatuses have Ethernet interfaces and Multimedia over Coax Alliance (MoCA) interfaces. Currently, protocols for integrating such different interfaces have been available (e.g., the IEEE 1905.1 Standard, the IEEE 1905.1a Standard, and the ITU-T G.hn protocol). These protocols can collect transmission information of interface types of the transceiving interfaces in the lower layers.

Path selection (i.e., how to select the most appropriate path when a network apparatus is to perform transmission with another network apparatus) is a common topic in various network systems. There are some available path selection technologies for homogeneous network systems (i.e., all network apparatuses of which support a same network communication standard, e.g., the Ethernet or a network system formed by optical fibers). In a homogeneous network system, a network apparatus can select a possible transmission path in a greedy mechanism through a next hop according to related communication protocols such as routing or bridging. These mechanisms may be classified into either a distance vector algorithm or link state algorithm. Details of the distance vector algorithm and the link state algorithm shall be well known to those of ordinary skill in the art, so no further description will be made herein.

Although two kinds of path selection mechanisms (i.e., the distance vector algorithm and the link state algorithm) are currently available, it is difficult to apply these algorithms to heterogeneous network systems. The main reason is that network communication standards supported by the network apparatuses in the heterogeneous network system are not all the same, so the dynamic link relationships are relatively complex. Each time there is a network apparatus joining in and/or leaving the heterogeneous network system, the topology and the link relationships of the heterogeneous network system change significantly. If the distance vector algorithm or the link state algorithm is adopted directly for path selection in the heterogeneous network system, it is often impossible to get the most appropriate path (i.e., the path with the lowest cost).

Accordingly, it is important to provide an efficient path selection mechanism for network apparatuses in a heterogeneous network system.

SUMMARY

Disclosed is a network apparatus for use in a heterogeneous network system. The heterogeneous network system comprises the network apparatus and a plurality of partner network apparatuses. The network apparatus comprises a storage unit, at least one transceiving interface and a processor that is electrically connected to the storage unit and the at least one transceiving interface. The storage unit is stored with at least one weight table. Each of the at least one weight table is associated with a network service condition. Each of the partner network apparatuses comprises at least one partner transceiving interface. Each of the partner transceiving interfaces has an interface type, each of the at least one transceiving interface has an interface type, and the interface types are not all the same. Each of the at least one transceiving interface is directly connected to at least one neighboring network apparatus. Each of the at least one neighboring network apparatus is one of the partner network apparatuses. Each of the at least one transceiving interface measures at least one first transmission parameter and receives a plurality of second transmission parameters. Each of the at least one first transmission parameter is associated with a transmission from at least one transceiving interface to at least one neighboring network apparatus. Each of the second transmission parameters is associated with a transmission from a first network apparatus to a second network apparatus neighboring the first network apparatus. Each of the first network apparatuses is one of the partner network apparatuses, while each of the second network apparatuses is one of the partner network apparatuses and the network apparatus. The processor selects at least one weight table as a selected weight table and enumerates a plurality of paths from the network apparatus to a target network apparatus, wherein the target network apparatus is one of the partner network apparatuses. The processor further calculates a path cost for each of the paths according to the selected weight table and at least a portion of the combination of the at least one first transmission parameter and the second transmission parameters.

Also disclosed is a rendezvous path selection method for a network apparatus. A heterogeneous network system comprises the network apparatus and a plurality of partner network apparatuses. Each of the partner network apparatuses comprises at least one partner transceiving interface, wherein each of the at least one partner transceiving interface has an interface type. The network apparatus comprises at least one transceiving interface, wherein each of the at least one transceiving interface has an interface type. The interface types are not all the same. Each of the at least one transceiving interface is directly connected to at least one neighboring network apparatus. Each of the at least one neighboring network apparatus is one of the partner network apparatuses. The network apparatus is stored with at least one weight table, wherein each of the at least one weight table is associated with a network service condition. The rendezvous path selection method comprises the following steps: (a) measuring at least one first transmission parameter, wherein each of the at least one first transmission parameter is associated with transmission from one of the at least one transceiving interface to one of the at least one neighboring network apparatus, (b) receiving a plurality of second transmission parameters, wherein each of the second transmission parameters is associated with transmission from a first network apparatus to a second network apparatus neighboring the first network apparatus, wherein each of the first network apparatuses is one of the partner network apparatuses, and each of the second network apparatuses is one of the partner network apparatuses and the network apparatus, (c) selecting one of the at least one weight table as a selected weight table, (d) enumerating a plurality of paths from the network apparatus to a target network apparatus, and (e) calculating a path cost for each of the paths according to the selected weight table and at least a portion of a combination of the at least one first transmission parameter and the second transmission parameters, wherein the target network apparatus is one of the partner network apparatuses.

Further disclosed is a heterogeneous network system, which comprises a plurality of partner network apparatuses and a network apparatus. The network apparatus is stored with at least one weight table, wherein each of the at least one weight table is associated with a network service condition. The network apparatus comprises at least one transceiving interface, wherein each of the at least one transceiving interface is directly connected to at least one neighboring network apparatus. Each of the at least one transceiving interface measures at least one first transmission parameter and receives a plurality of second transmission parameters. Each of the at least one neighboring network apparatus is one of the partner network apparatuses. Each of the at least one first transmission parameter is associated with a transmission from one of the at least one transceiving interface to one of the at least one neighboring network apparatus. Each of the second transmission parameters is associated with a transmission from a first network apparatus to a second network apparatus neighboring the first network apparatus. Each of the first network apparatuses is one of the partner network apparatuses, while each of the second network apparatuses is one of the partner network apparatuses and the network apparatus. The network apparatus further selects one of the at least one weight table as a selected weight table and enumerates a plurality of paths from the network apparatus to a target network apparatus, wherein the target network apparatus is one of the partner network apparatuses. The network apparatus further calculates a path cost for each of the paths according to the selected weight table and at least a portion of the combination of the at least one first transmission parameter and the second transmission parameters. Each of the partner network apparatuses comprises at least one transceiving interface. Each of the at least one transceiving interface has an interface type. The interface types are not all the same.

According to the disclosed technology, each of the network apparatuses comprised in a heterogeneous network system measures a transmission parameter between the network apparatus and each network apparatus neighboring to the network apparatus, transmits the measured transmission parameter, and receives the transmission parameters transmitted by other network apparatuses. Therefore, each of the network apparatuses can obtain not only local transmission information (i.e., the transmission parameters between the network apparatus and the neighboring network apparatuses) but also global transmission information (i.e., the transmission parameters between other network apparatuses). Moreover, the network apparatus selects a weight table that is associated with a network service condition as a selected weight table. Thereafter, the network apparatus calculates the path cost of each of the paths according to the selected weight table, the local transmission information and the global transmission information. Because the network apparatus makes reference to the selected weight table, the local transmission information, and the global transmission information during the calculation of the path cost for each of the paths, accurate path costs can be calculated. Hence, most appropriate transmission path can be selected.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1C depicts a plurality of second transmission parameters received by the network apparatus A;

FIG. 1D depicts a specific example of a weight table 10a;

FIG. 1E depicts a specific example of a weight table 10b;

FIG. 1F depicts a specific example of a weight table 10c;

FIG. 1I depicts the path cost of each of the paths from the network apparatus A to the network apparatus C;

DETAILED DESCRIPTION

In the following description, a heterogeneous network system, a network apparatus, and a rendezvous path selection method thereof will be explained with reference to example embodiments thereof. However, these example embodiments are not intended to limit the present invention to any specific examples, embodiments, environment, applications, or particular implementations described in these embodiments. Therefore, the descriptions of these example embodiments is only for purpose of illustration rather than to limit the present invention. It should be appreciated that elements unrelated to the present invention are omitted from depiction in the following embodiments and attached drawings.

Figure 1A:
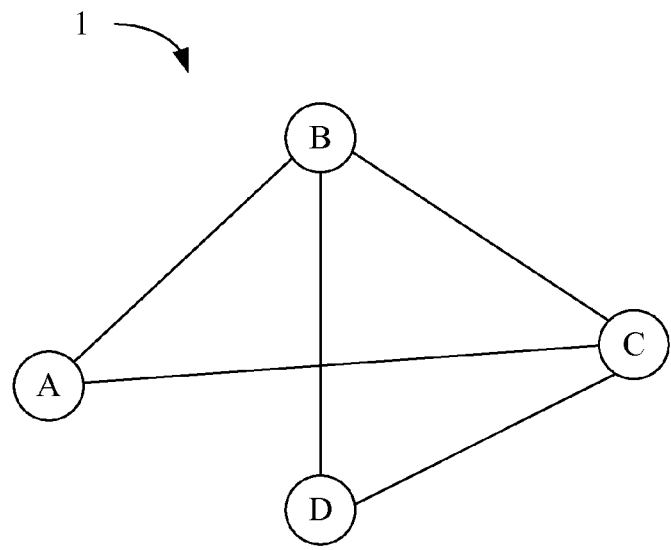
FIG. 1A is a schematic view depicting a topological structure of a heterogeneous network system 1 according to a first embodiment.

A first embodiment of the present invention provides a heterogeneous network system 1 and a schematic view of a topological structure thereof is depicted in FIG. 1A. The heterogeneous network system 1 comprises four network apparatuses A, B, C, and D. Each of the network apparatuses A, B, C, and D has at least one transceiving interface. The connections of the network apparatuses A, B, C, and D (through the transceiving interfaces) are shown in FIG. 1A. In FIG. 1A, any two network apparatuses connected to each other by a straight line are neighboring network apparatuses to each other, e.g., the neighboring network apparatuses of the network apparatus A include the network apparatus B and the network apparatus C. The meaning of neighboring network apparatuses will be detailed later.

It shall be appreciated that no limitation is made to the number of network apparatuses comprised in one heterogeneous network system in the present invention as long as the number is finite. For example, the heterogeneous network system 1 may be a home network in some embodiments. Moreover, no limitation is made to the topological structure of the plurality of network apparatuses comprised in one heterogeneous network system in the present invention. For example, unlike the topology shown in FIG. 1A, the network apparatuses in some other embodiments must be fully connected. Additionally, each of the transceiving interfaces comprised in the network apparatuses A, B, C, and D has an interface type, wherein the interface types are not all the same. For example, the interface types may include Power Line Communication (PLC) interfaces, Wi-Fi interfaces, Ethernet interfaces, Multimedia over Coax Alliance (MoCA) interfaces, or other interfaces with communication functionality.

In the present invention, one heterogeneous network system comprises a plurality of network apparatuses. From the perspective of one of the network apparatuses, the other network apparatuses comprised in the heterogeneous network system may be viewed as partner network apparatuses of the network apparatus. For example, from the perspective of the network apparatus A, the network apparatuses B, C, and D may be viewed as partner network apparatuses of the network apparatus A. As another example, from the perspective of the network apparatus B, the network apparatuses A, C, and D may be viewed as partner network apparatuses of the network apparatus B. For ease of description, the transceiving interfaces of the partner network apparatuses may be called partner transceiving interfaces. Moreover, in the present invention, if a network apparatus can directly measure the transmission parameter between the network apparatus itself and another network apparatus, the another network apparatus is the neighboring network apparatus thereof. For example, the transceiving interface of the network apparatus A can directly measure the transmission parameter between the network apparatus A itself and the network apparatus B, so the network apparatus B is the neighboring network apparatus of the network apparatus A.

In the present invention, each of the network apparatuses comprised in a heterogeneous network system utilizes a weight table associated with a network service condition, the local transmission information (i.e., the transmission parameters between the network apparatus and the neighboring network apparatuses that can be directly measured by a network apparatus) and the global transmission information (i.e., the transmission parameters between other network apparatuses that cannot be directly measured by a network apparatus) to calculate the path cost. A path is then selected for subsequent transmission according to the calculated path cost. The details of the network service conditions will be described later.

In this embodiment, the network apparatuses A, B, C, and D operate similarly in terms of calculating path costs and selecting a desired path for transmission. Therefore, only the operations performed by the network apparatus A in terms of calculating path costs and selecting a desired path for transmission will be described in detail. How the network apparatuses B, C, and D operate to calculate path costs and select a desired path for transmission shall be readily appreciated by those of ordinary skill in the art according to the description of the network apparatus A.

Figure 1B:
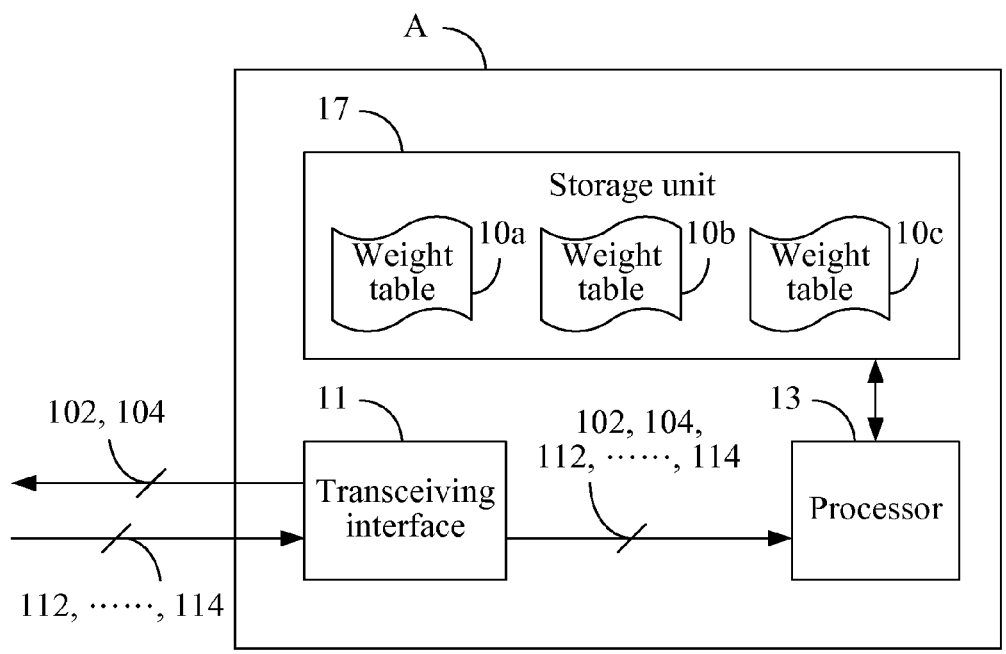
FIG. 1B is a schematic structural view of a network apparatus A according to the first embodiment.

FIG. 1B is a schematic structural view of the network apparatus A according to the first embodiment. The network apparatus A comprises a transceiving interface 11, a processor 13, and a storage unit 17. The processor 13 is electrically connected to the transceiving interface 11 and the storage unit 17. The transceiving interface 11 may be any interface capable of receiving and transmitting control signals and/or data wirely or wirelessly. The processor 13 may be any various processors, central processing units (CPUs), microprocessors, or other computing apparatuses known to those of ordinary skill in the art. The storage unit 17 may be a memory, a floppy disk, a hard disk, a compact disk (CD), a mobile disk, a magnetic tape, a database, or any other storage media or circuits with the same function and well known to those of ordinary skill in the art.

In this embodiment, the storage unit 17 is stored with three weight tables 10a, 10b, and 10c. Each of the weight tables 10a, 10b, and 10c is associated with a network service condition. The network service condition may be construed as a factor that might affect the data/signal transmission of a network service in the heterogeneous network system 1. For example, the network service condition may be associated with one of a service type, a network property, a type of a source device, and a combination thereof but is not limited thereto. In the specification of the present invention, the service type refers to the type of a network service that performs data/signal transmission on the heterogeneous network system 1, e.g., a film, voice, an instant game, network browsing, an E-mail, etc., but is not limited thereto.

In the specification of the present invention, the network property refers to the communication standard adopted by a transceiving interface (or a link formed between two transceiving interfaces) through which a network service performs data/signal transmission on the heterogeneous network system 1, e.g., a Wi-Fi communication standard, an Ethernet communication standard, etc., but is not limited thereto. In the specification of the present invention, the type of source device refers to the type of source device of a network service, e.g., a game console, a TV, etc., but is not limited thereto. In this embodiment, it is assumed that the weight table 10a is associated with the service type, the weight table 10b is associated with the network property, and the weight table 10c is associated with the type of source device. It shall be appreciated that no limitation is made to the number of the weight tables stored in a network apparatus as long as at least one weight table is stored in the network apparatus.

In this embodiment, each of the transceiving interfaces comprised in the network apparatuses A, B, C, and D measures a transmission parameter between the network apparatus itself and each of the neighboring network apparatuses (i.e., obtains the local transmission parameters). The transmission parameters represent the transmission status, the transmission capacity, the transmission quality, and/or other parameters associated with transmission between two network apparatuses neighboring each other. Here, the network apparatus A is taken as an example for detailed description. The transceiving interface 11 of the network apparatus A is directly connected (either in wirely or wirelessly) to the network apparatuses B and C. For each of the neighboring network apparatuses (i.e., the network apparatuses B and C) of the network apparatus A, the transceiving interface 11 individually measures a first transmission parameter (i.e. the first transmission parameter 102 and 104 for the network apparatuses B and C respectively) between the network apparatus A and the neighboring network apparatus. Each of the first transmission parameters 102 and 104 is associated with a transmission from the transceiving interface 11 to the corresponding neighboring network apparatus.

Specifically, the transceiving interface 11 measures the first transmission parameter 102 between the network apparatus A and the network apparatus B, wherein the first transmission parameter 102 is associated with a transmission from the transceiving interface 11 to the network apparatus B. The transceiving interface 11 measures the first transmission parameter 104 between the network apparatus A and the network apparatus C, wherein the first transmission parameter 104 is associated with a transmission from the transceiving interface 11 to the network apparatus C. Each of the transceiving interfaces comprised in the network apparatuses A, B, C, and D will transmit the measured transmission parameters after it measures the transmission parameters between itself and each of the neighboring network apparatuses. Using network apparatus A as an example, the transceiving interface 11 will transmit the first transmission parameters 102 and 104. It shall be appreciated that the present invention does not limit the way that the transceiving interfaces transmit the transmission parameters. For example, a transceiving interface may transmit the measured transmission parameters through broadcasting, multicasting, unicasting, or other manners.

Moreover, each of the network apparatuses A, B, C, and D comprised in the heterogeneous network system 1 receives the transmission parameters transmitted by other network apparatuses (i.e., obtains the global transmission parameters). Using network apparatus A as an example, the transceiving interface 11 receives a plurality of second transmission parameters 112, . . . , 114. Each of the second transmission parameters 112, . . . , 114 is associated with a transmission from one of the partner network apparatuses B, C, and D of the network apparatus A (shortened to "a first network apparatus") to a second network apparatus neighboring the first network apparatus (which may be one of the network apparatuses A, B, C, and D comprised in the heterogeneous network system 1). FIG. 1C depicts the plurality of second transmission parameters received by the network apparatus A. For example, if the second transmission parameter 112 is associated with a transmission from the network apparatus C to the network apparatus A, the network apparatus C is the first network apparatus and the network apparatus A is the second network apparatus with respect to the second transmission parameter 112.

As another example, if the second transmission parameter 114 is associated with a transmission from the network apparatus C to the network apparatus B, the network apparatus C is the first network apparatus and the network apparatus B is the second network apparatus with respect to the second transmission parameter 114. It shall be appreciated that the present invention does not limit the way that the network apparatuses A, B, C, and D receive the transmission parameters transmitted by other network apparatuses. Furthermore, the present invention does not limit the number of hops through which the network apparatuses A, B, C, and D receive the transmission parameters transmitted by other network apparatuses.

It shall be appreciated that in some embodiments, each of the network apparatuses A, B, C, and D may measure the transmission parameters many times (e.g., periodically) and receive the transmission parameters many times (e.g., periodically) so that each of the network apparatuses A, B, C, and D can update the transmission parameters in real time to calculate the path cost more accurately.

Each of the network apparatuses A, B, C, and D comprised in the heterogeneous network system 1 selects one of the at least one weight table as a selected weight table for use in the subsequent calculation of the cost paths. It shall be appreciated that the present invention does not limit the way to select a selected weight table. For example, the network apparatus may receive a signal inputted from a user via an input interface and select a selected weight table according to the signal. In other words, the user may set the network service condition that is more important to him/her depending on his/her preference so that the network apparatus selects the corresponding weight table according to the setting of the user.

Here, the network apparatus A is taken as an example for detailed description. The processor 13 of the network apparatus A selects one of the three weight tables 10a, 10b, and 10c as the selected weight table (e.g., the weight table 10a). It shall be further appreciated that the time point that each of the network apparatuses A, B, C, and D selects one of the at least one weight table as the selected weight table is not limited by the present invention as long as the weight table is selected before calculating the path cost of each of the paths. Additionally, in the present invention, the selected weight tables of the network apparatuses A, B, C, and D does not have to be all the same. Furthermore, in some embodiments, any of the network apparatuses A, B, C, and D may dynamically change its selected weight table.

Thereafter, each of the network apparatuses A, B, C, and D comprised in the heterogeneous network system 1 enumerates a plurality of paths towards other network apparatuses and calculate the path cost of each of the paths so that the desired path for subsequent transmission may be selected according to the path costs. Here, the network apparatus A is used as an example for detailed description again. The processor 13 of the network apparatus A enumerates a plurality of paths from the network apparatus A to one (or more) target network apparatuses, where each target network apparatus is one of the partner network apparatuses of the network apparatus A (i.e., the network apparatuses B, C, and D), e.g., the network apparatus C.

In some embodiments, the processor 13 may enumerate the aforesaid paths according to a hop count. For example, the processor 13 may enumerate the paths from the network apparatus A to the target network apparatus (e.g., the network apparatus C) according to a hop count value of 2 so that the hop counts involved in the enumerated paths are not greater than 2. In this example, there are three paths from the network apparatus A to the target network apparatus (e.g., the network apparatus C), namely: (1) a path from the network apparatus A directly to the network apparatus C, (2) a path from the network apparatus A through the network apparatus B to the network apparatus C, and (3) a path from the network apparatus A through the network apparatus B and then through the network apparatus D to the network apparatus C.

Then, the processor 13 calculates the path cost of each of the paths from the network apparatus A to the target network apparatus (e.g., the network apparatus C) according to the selected weight table (e.g., the weight table 10*a*) and at least a portion of the first transmission parameters 102, 104 and the second transmission parameters 112, . . . , 114. Because the selected weight table is one of the factors taken into consideration during the calculation of the path costs, the path cost of the same path varies when the selected weight table selected by the network apparatus A varies.

In some embodiments, each of the at least one weight table stored in a network apparatus comprises a plurality of weight settings. In these embodiments, the processor of the network apparatus selects at least one of the weight settings as at least one selected weight setting and calculates the path cost for each of the paths according to the at least one selected weight setting and at least a portion of a combination of the at least one first transmission parameter and the second transmission parameters. Here, the network apparatus A is taken as an example for detailed description. For example, the weight table 10*a* stored in the network apparatus A is associated with the service type and may comprise five weight settings that respectively correspond to film, voice, instant games, network browsing, and E-mail. As another example, the weight table 10*b* stored in the network apparatus A is associated with the network property and may comprise three weight settings that respectively correspond to Ethernet communication standard, Wi-Fi communication standard, and PLC communication standard.

As yet another example, the weight table 10*c* stored in the network apparatus A is associated with the type of the source device and may comprise three weight settings that respectively correspond to game consoles, TVs, and high-priority devices. It shall be appreciated that the aforesaid weight settings comprised in the weight tables 10*a*, 10*b*, and 10*c* are only provided as an example and are not intended to limit the scope of the present invention. For example, if the network apparatus A selects the weight table 10*a* as the selected weight table, the processor 13 of the network apparatus A further determines the service type (e.g., a film) of the network service that is currently performing (or is going to perform) data/signal transmission on the heterogeneous network system 1, selects the weight setting that corresponds to the film (for example) from the weight table 10*a* as the selected weight setting, and then calculates the path cost for each of the paths according to the selected weight setting and at least a portion of the combination of the at least one first transmission parameter and the second transmission parameters.

In some embodiments, each of the aforesaid weight settings may further comprise a plurality of weight values. Each of the at least one first transmission parameter and the second transmission parameters may further comprise a plurality of sub-parameters, wherein each of the sub-parameters corresponds to one of the weight values. A specific example is hereby described for ease of understanding. FIGS. 1D, 1E and 1F respectively depict the specific examples of the weight tables 10*a*, 10*b*, and 10*c*. In these specific examples, each of the weight settings comprised in the weight tables 10*a*, 10*b*, and 10*c* comprises a plurality of weight values, namely, the weight value of a round trip time (RTT), the weight value of an available bandwidth, and the weight value of a Quality of Service (QoS). Moreover, each of the first transmission parameters 102, 104 and the second transmission parameters 112, . . . , 114 comprises a plurality of sub-parameters, namely, the round trip time (RTT), the available bandwidth, and the Quality of Service (QoS). Each of the sub-parameters comprised in each of the first transmission parameters 102, 104 and the second transmission parameters 112, . . . , 114 corresponds to one of the aforesaid weight values.

In these embodiments, the processor 13 of the network apparatus A calculates the path cost of each of the paths according to these correspondence relationships. It shall be appreciated that the aforesaid types of the sub-parameters and the types of the weight values are only described as examples and are not intended to limit the scope of the present invention.

When each of the weight settings comprises a plurality of weight values, the weight values of each of the weight settings have a sum and the sums may be or may not be all the same. For example, FIG. 1D illustrates five weight settings and the corresponding five service types, including film, voice, instant game, network browsing, and E-mail. The sums of the weight values of the five different weight settings are 7, 6, 8, 11, and 14. The sums of the weight values of different weight settings are set to be unequal in order to distinguish different service types and improve the service quality. Specifically, if the sum of the weight values corresponding to a service type is lower, it means that the network service of this service type has a lower path cost. On the contrary, if the sum of the weight values corresponding to a service type is greater, then it means that the network service of this service type has a higher path cost.

In some embodiments, an administrator of the heterogeneous network system 1 may further set the transmission priority of the network service with a lower path cost to be higher and set the transmission priority of the network service with a higher path cost to be lower to allow for disconnection thereof. Here, a specific example will be described. In this example, it is assumed that there are two network services whose service types are "voice" and "E-mail," the two network services need to transmit data, and the values of the sub-parameters (e.g., the RTT, the available bandwidth, and the QoS) comprised in the transmission parameters of each of the two network services are the same. In this example, the network service having the service type "E-mail" will have a higher path cost based on the calculation because the sum of the weight values corresponding to the network service having the service type "E-mail" is higher. As a result, the transmission priority thereof will be lower. Additionally, in some embodiments, the sums of the weight values of each of the weight settings may be set to be equal in order to improve the fairness of scheduling.

In some embodiments, each of the paths comprises at least one link (i.e., the link between the network apparatuses that are neighboring to each other), each of the links has a link transmission parameter, and each of the link transmission parameters is one of the first transmission parameters 102, 104 and the second transmission parameters 112, . . . , 114. The processor 13 calculates the path costs according to the weight values of at least one selected weight setting and the link transmission parameters corresponding to the links comprised in each of the paths.

Figures 1G, 1H:
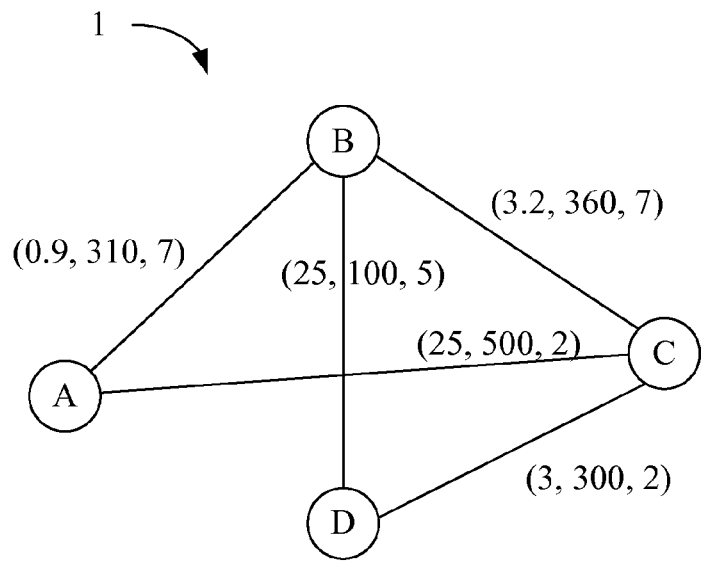
FIG. 1G depicts an exemplary example of the transmission parameters between network apparatuses A, B, C, and D.
FIG. 1H depicts correspondence relationships between original values of sub-parameters and normalized values of the sub-parameters.

For ease of understanding, a specific example is hereby detailed with reference to FIGS. 1D, 1G, 1H and 1I. In this specific example, the processor 13 of the network apparatus A selects the weight table 10*a* of FIG. 1D as the selected weight table, determines that the service type of the network service that is currently performing (or is going to perform) data/signal transmission on the heterogeneous network system 1 is "film," and then selects the weight setting corresponding to "film" from the weight table 10*a* as the selected weight setting. In other words, in this specific example, the weight values of the RTT, the available bandwidth, and the QoS are respectively 2, 3, and 2. Moreover, in this specific example, each of the first transmission parameters 102, 104 and the second transmission parameters 112, . . . , 114 comprises three sub-parameters, namely, the RTT, the available bandwidth, and the QoS FIG. 1G depicts the values of the three sub-parameters comprised in each of the transmission parameters. The first value in each bracket represents the RTT and the unit thereof is ms, the second value in each bracket represents the available bandwidth and the unit thereof is Mbps, and the third value in each bracket represents the code of the available QoS (e.g., the code of the QoS specified in the IEEE 802.1Q standard, in which the smaller the value, the poorer the quality of service).

In this specific example, the transmission parameters from one network apparatus to another network apparatus are the same as the transmission parameters from the another network apparatus to the network apparatus (e.g., the transmission parameters from the network apparatus A to the network apparatus B are the same as the transmission parameters from the network apparatus B to the network apparatus A). However, it shall be noted that the transmission parameters from a network apparatus to another network apparatus may be different from the transmission parameters from the another network apparatus to the network apparatus in some embodiments.

In some embodiments, the processor 13 may normalize the sub-parameters before using them to calculate the path costs in order achieve a better and more accurate effect. FIG. 1H depicts the correspondence relationships between the original values of the sub-parameters and the normalized values of the sub-parameters. When RRT is used as one sub-parameter, a longer RTT causes a higher cost and, hence, correspond to a greater normalized value. When the available bandwidth is used as one sub-parameter, a smaller available bandwidth causes a higher cost and, hence, corresponds to a greater normalized value. When the QoS parameter is used as a sub-parameter, a smaller index of the QoS parameter represents a poorer quality of service according to the IEEE 802.1Q standard and, hence, corresponds to a greater normalized value. Here, the table depicted in FIG. 1H is taken as an example for description. If the RTT is 0.9 ms, the normalized value is 1. If the available bandwidth is 310 Mbps, the normalized value is 6. If the indext of the QoS parameter is 7, the normalized value is 1. In this specific example, each of the RTT, the available bandwidth, and the QoS parameter comprised in the same transmission parameter corresponds to a weight value. For example, if the service type of the network service is "film," the weight values corresponding to the RTT, the available bandwidth, and the QoS are respectively 2, 3, and 2. The sum of the weight values is 7 (i.e., 2+3+2=7).

FIG. 1I illustrates the path costs of the paths from the network apparatus A to the target network apparatus (e.g., the network apparatus C) that are calculated in the aforesaid way. In FIG. 1I, three paths from the network apparatus A to the network apparatus C are enumerated, including (1) a path from the network apparatus A directly to the network apparatus C (called "a first path" hereinafter), (2) a path from the network apparatus A through the network apparatus B to the network apparatus C (called "a second path" hereinafter), and (3) a path from the network apparatus A through the network apparatus B and then through the network apparatus D to the network apparatus C (called "a third path" hereinafter). The path cost of the first path is 30 (i.e., 2×3+3×4+2=30). The second path involves two links, namely, a first link from the network apparatus A to the network apparatus B and a second link from the network apparatus B to the network apparatus C.

The RTT used in the second path is the sum of the RTT corresponding to the first link and the RTT corresponding to the second link (i.e., 0.9 ms+3.2 ms=4.1 ms). The available bandwidth used in the second path is the smaller one of the available bandwidth corresponding to the first link and the available bandwidth corresponding to the second link (i.e., min(310, 360)). The QoS used in the second path is the smaller one of the QoS corresponding to the first link and the QoS corresponding to the second link (i.e., min(7, 7)). After the RTT, the available bandwidth, and the QoS used in the second path are determined, they are individually normalized to calculate the path cost. The calculated path cost is 22 (i.e., 2×1+3×6+2×1=22). Based on the same principle, the path cost of the third path is 42 (i.e., 2×3+3×8+2×6=42). Because the second path has the lowest path cost, the processor 13 can select the second path (i.e., the path from the network apparatus A through the network apparatus B to the network apparatus C) as the transmission path from the network apparatus A to the network apparatus C.

As mentioned earlier, the network apparatus A may also calculate the path costs of the paths towards other target network apparatuses (e.g., the network apparatuses B and D) and then select the transmission path accordingly. Similarly, other network apparatuses may also calculate the path costs through the aforesaid operations and then select the desired path for subsequent transmission accordingly. Hence, the details are not repeated herein.

It shall be appreciated that in some embodiments, each weight value in each of the weight tables stored in each network apparatus (e.g., the weight tables 10a, 10b, and 10c stored in the network apparatus A) may be updated dynamically (e.g., periodically or aperiodically). For example, the administrator of the heterogeneous network system 1 may input the weight values into each of the weight tables depending on the network usage condition of the heterogeneous network system 1 and/or his/her preference so that the processor 13 dynamically updates contents of the weight tables according to the information inputted by the user.

Since these weight tables are dynamically updated, the processor 13 can also dynamically calculate the path cost of each of the paths and then further determine whether to change the transmission path or not. For example, if the processor 13 has determined that the transmission path currently used by a network service is no longer the one corresponding to the lowest path cost, the transmission path that is currently used by the network service may be replaced by the path corresponding to the lowest path cost. Through dynamically updating the weight tables and calculating the path costs, not only is the network usage condition and/or the preference of the administrator reflected, but the network utilization ratio can be improved remarkably.

In some embodiments, the network apparatus A needs to transmit data for a plurality of network services. The network services may correspond to different target network apparatuses. For each of the network services, the processor 13 of the network apparatus A calculates, through the aforesaid operations, the path cost of each of the paths through which the data of the network service is transmitted from the network apparatus A to the target network apparatus and then selects the desired path for subsequent transmission accordingly. The processor 13 of the network apparatus A further determines (e.g., according to the current network resources) whether to transmit data simultaneously for these network services, or only to transmit data for one or more network services with lower path costs (i.e., having higher transmission priorities) firstly and suspend other network services with higher path costs from transmitting data via the corresponding paths.

In some embodiments, for each of the network services, the processor 13 of the network apparatus A may dynamically (e.g., periodically or aperiodically) calculate the path cost of each of the paths and then dynamically select the desired path for subsequent transmission accordingly. For any of the network services, the paths selected by the network apparatus A at different time points may vary, i.e., the network apparatus A can dynamically provide paths for data transmission. Furthermore, since the processor 13 of the network apparatus A can dynamically decide the desired path for subsequent transmission, it can dynamically determine (e.g., according to the current network resources) whether to transmit data for these network services at the same time or only to transmit data for one or more network services with lower path costs (i.e., having higher transmission priorities) firstly and suspend other network services with higher path costs from transmitting data via the corresponding paths.

Since the path costs calculated at different time points are different and the network resources at different time points are also different, the processor 13 of the network apparatus A may also dynamically decide for which network services the data will be transmitted firstly. Under this mechanism, if the priority of the network service whose data were transmitted firstly by the network apparatus A originally is lowered, the network apparatus A will instead transmit data of the network service with a higher transmission priority.

It shall be appreciated that the network apparatuses A, B, C, and D comprised in the heterogeneous network system 1 may update the transmission parameters timely to make the calculated path costs more accurate. For example, each of the network apparatuses A, B, C, and D may periodically measure the transmission parameters between itself and the neighboring network apparatuses, transmit the measured transmission parameters periodically, and receive the transmission parameters transmitted by other network apparatuses periodically. As another example, the transmission parameters may also be updated when a new network apparatus joins the heterogeneous network system 1 or when any of the network apparatuses leaves the heterogeneous network system 1. Furthermore, if the network apparatuses A, B, C, and D use the RTT as the sub-parameters, the RTT may be a value obtained by averaging RTTs acquired at different time points to make the calculated path cost more accurate. Similarly, if the network apparatuses A, B, C, and D use the available bandwidth as the sub-parameters, the available bandwidth may be a value obtained by averaging available bandwidths acquired at different time points to make the calculated path cost more accurate.

It shall be further appreciated that if any one (or more) of the network apparatuses A, B, C, and D comprised in the heterogeneous network system 1 comprises a plurality of transceiving interfaces, the path costs of different paths formed by the different transceiving interfaces may also be calculated in the aforesaid way and then the desired path be selected for subsequent transmission accordingly.

As can be known from the above descriptions, each of the network apparatuses A, B, C, and D comprised in the heterogeneous network system 1 measures a transmission parameter between itself and each of the neighboring network apparatuses, transmits the measured transmission parameters, and receives the transmission parameters transmitted by other network apparatuses. Accordingly, each of the network apparatuses A, B, C, and D can obtain not only local transmission information (i.e., the transmission parameters between itself and the neighboring network apparatuses) but also global transmission information (i.e., the transmission parameters between other network apparatuses). Moreover, because each of the network apparatuses A, B, C, and D selects a weight table that is associated with a network service condition as a selected weight table and calculates the path cost of each of the paths according to the selected weight table, the local transmission information, and the global transmission information, accurate path costs can be calculated to select the most appropriate transmission path.

The transmission parameters used in this embodiment may comprise a plurality of sub-parameters (e.g., the RTT, the available, bandwidth and the QoS). The weight table may comprise a plurality of weight settings. Each of the weight settings may comprise a plurality of weight values. Each of the transmission parameters corresponds to one of the weight values. Therefore, applications running in the heterogeneous network system 1 and users or operators of the heterogeneous network system 1 may select desired sub-parameters and selected weight tables depending on the status of the heterogeneous network system 1 or depending on their preferences so as to achieve a higher network utilization ratio.

Figure 2A:
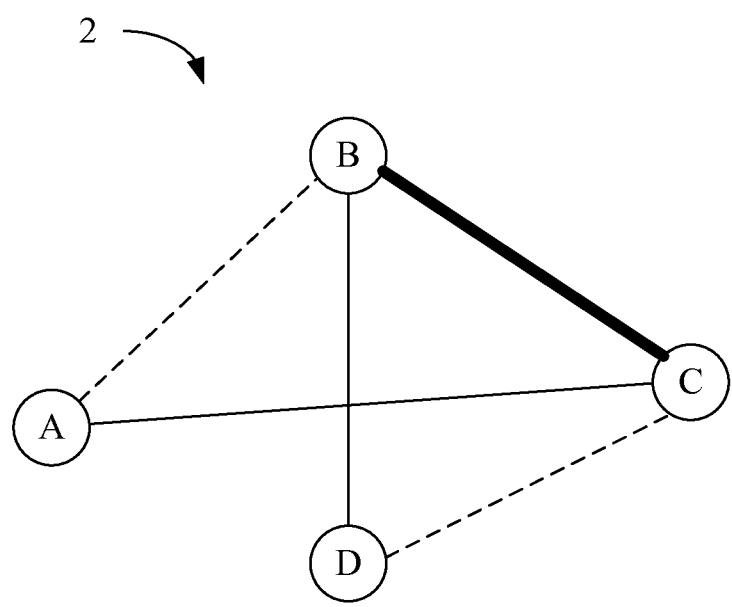
FIG. 2A is a schematic view depicting a topological structure of a heterogeneous network system 2 according to a second embodiment of the present invention.

A second embodiment of the present invention provides a heterogeneous network system 2. A schematic view of a topological structure thereof is depicted in FIG. 2A. The heterogeneous network system 2 also comprises network apparatuses A, B, C, and D; however, each of the network apparatuses A, B, C, and D has a plurality of transceiving interfaces. The interface types of the transceiving interfaces comprised in the same network apparatus are different. In FIG. 2A, any two network apparatuses connected to each other by a straight line (including solid lines and dashed lines having different thicknesses) are neighboring network apparatuses to each other, while different types of the straight lines represent different interface types of transceiving interfaces.

The second embodiment differs from the first embodiment in that each of the network apparatuses A, B, C, and D may comprise a plurality of transceiving interfaces. The interface types of the transceiving interfaces comprised in the same network apparatus are different. Due to these differences, the ways in which the transmission parameters are measured, received, and transmitted are slightly different in the second embodiment. As to the weight tables stored in the network apparatuses A, B, C, and D, the ways that the network apparatuses A, B, C, and D select a selected weight table, enumerate the paths, and calculate the path costs by using the selected weight tables are the same in these two embodiments. Further, all of the network apparatuses A, B, C, and D operate similarly in this embodiment. Therefore, the differences between the second embodiment and the first embodiment will be detailed from only the perspective of the network apparatus A hereinafter.

Figure 2B:
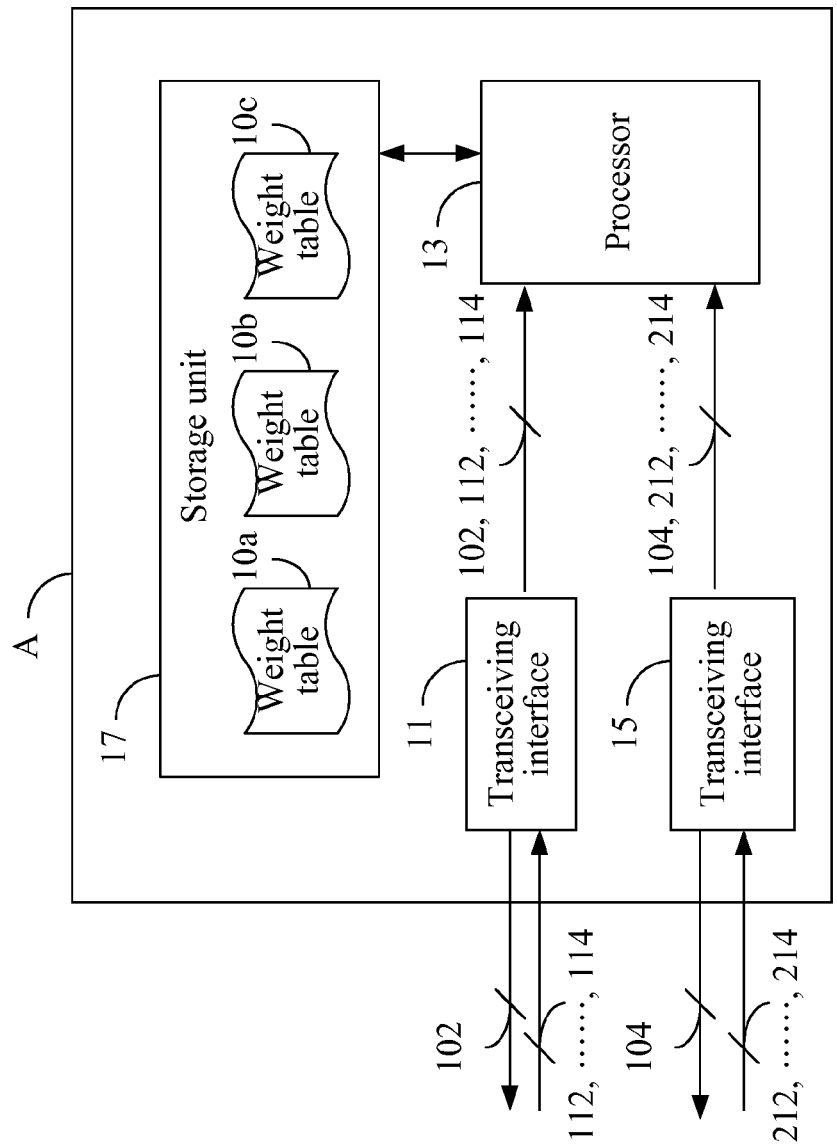
FIG. 2B is a schematic structural view of the network apparatus A according to the second embodiment.

FIG. 2B is a schematic structural view of the network apparatus A according to the second embodiment. The network apparatus A comprises two transceiving interfaces 11, 15, a processor 13, and a storage unit 17. The processor 13 is electrically connected to the transceiving interfaces 11, 15 and the storage unit 17. The interface type of the transceiving interface 11 is different from that of the transceiving interface 15. For example, the transceiving interface 11 is a Wi-Fi interface, while the transceiving interface 15 is an Ethernet interface. The network apparatus A is connected to the network apparatus B via the transceiving interface 11 and is connected to the network apparatus C via the transceiving interface 15.

In this embodiment, the network apparatus A also obtains local transmission information and global transmission information. Each of the transceiving interface 11 and the transceiving interface 15 comprised in the network apparatuses A measures a transmission parameter between itself and each of the neighboring network apparatuses (i.e., obtains the local transmission information). Specifically, because the network apparatus A is connected to the network apparatus B via the transceiving interface 11, the transceiving interface 11 measures the first transmission parameter 102 associated with transmission from the transceiving interface 11 to the network apparatus B.

Furthermore, since the network apparatus A is connected to the network apparatus C via the transceiving interface 15, the transceiving interface 15 measures the first transmission parameter 104 associated with transmission from the transceiving interface 15 to the network apparatus C. Each of the transceiving interfaces comprised in the network apparatuses A, B, C, and D transmits the measured transmission parameters after it measures the transmission parameters between itself and the neighboring network apparatuses. Taking the network apparatus A as an example, the transceiving interface 11 transmits the first transmission parameter 102, while the transceiving interface 15 transmits the first transmission parameter 104.

Additionally, each of the transceiving interfaces comprised in the network apparatuses A, B, C, and D receives the transmission parameters transmitted by the transceiving interfaces of other network apparatuses (i.e., obtains the global transmission information). For example, in apparatus A, the transceiving interface 11 receives a plurality of second transmission parameters 112, ..., 114. Each of the second transmission parameters 112, ..., 114 is associated with transmission from a first network apparatus to a second network apparatus neighboring to the first network apparatus, wherein each of the first network apparatuses is one of the partner network apparatuses of the network apparatus A (i.e., the network apparatuses B, C, and D) and each of the second network apparatuses is one of the network apparatuses A, B, C, and D. Similarly, the transceiving interface 15 receives a plurality of second transmission parameters 212, ..., 214.

Each of the second transmission parameters 212, ..., 214 is associated with transmission from a first network apparatus to a second network apparatus neighboring to the first network apparatus, wherein each of the first network apparatuses is one of the partner network apparatuses of the network apparatus A (i.e., the network apparatuses B, C, and D) and each of the second network apparatuses is one of the network apparatuses A, B, C, and D.

In this embodiment, each of the network apparatuses A, B, C, and D selects a selected weight table. Using the network apparatus A as an example, its processor 13 selects one of the weight tables 10a, 10b, and 10c as a selected weight table. Regarding the contents of the weight tables 10a, 10b, and 10c, the time point that the processor 13 selects the selected weight table, and other technical contents/details associated with the weight tables 10a, 10b, and 10c and the selected weight table, this embodiment and the first embodiment are essentially the same. Hence, the details are not repeated.

Thereafter, each of the network apparatuses A, B, C, and D comprised in the heterogeneous network system 2 can enumerate a plurality of paths towards other network apparatuses and calculate the path cost of each of the paths according to the selected weight table so that the desired path for subsequent transmission is selected according to the path costs. The way that the network apparatuses A, B, C, and D of the heterogeneous network system 2 enumerate the paths and calculate the path costs is the same as that of the first embodiment. Hence, the details are not repeated herein.

From the above descriptions, when the transceiving interface types involved in the heterogeneous network system 2 are relatively diversified (i.e., one, some, or all of the network apparatuses A, B, C, and D comprise(s) a plurality of transceiving interfaces and the interface types of the transceiving interfaces are different), any of the network apparatuses comprised in the heterogeneous network system 2 will also calculate the path cost of each of the paths according to the selected weight table, the local transmission information, and the global transmission information. Thereby, accurate path costs can be calculated to select the most appropriate transmission path.

Figure 3:
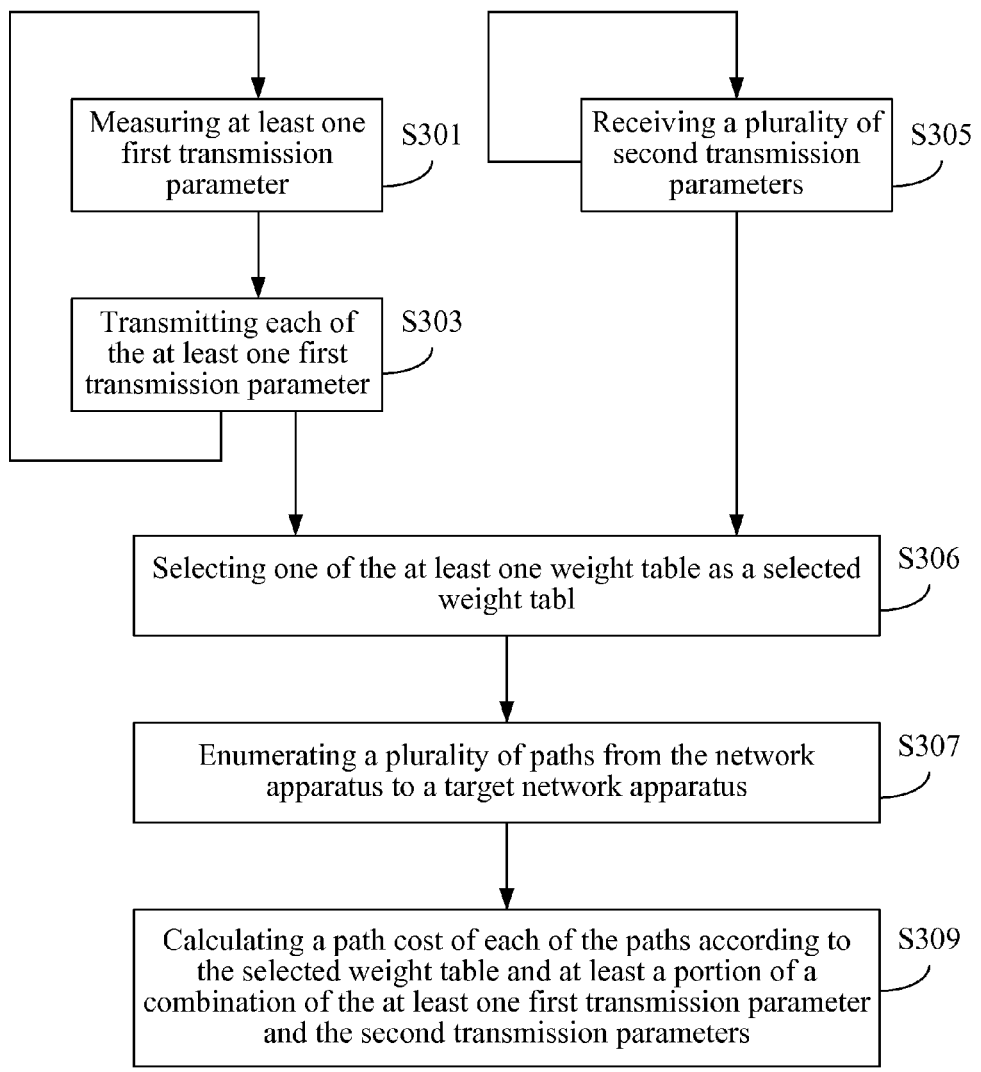
FIG. 3 is a flowchart diagram of a rendezvous path selection method according to a third embodiment of the present invention.

A third embodiment of the present invention provides a rendezvous path selection method and a flowchart diagram of which is depicted in FIG. 3. The rendezvous path selection method is used for a network apparatus (e.g., any of the network apparatuses A, B, C, and D comprised in the heterogeneous network system 1 of the first embodiment and any of the network apparatuses A, B, C, and D comprised in the heterogeneous network system 2 of the second embodiment). A heterogeneous network system comprises the network apparatus and a plurality of partner network apparatuses, wherein the network apparatus is directly connected to at least one neighboring network apparatus and each of the at least one neighboring network apparatus is one of the partner network apparatuses.

Each of the network apparatus and the partner network apparatuses comprises at least one transceiving interface. Each of the transceiving interfaces has an interface type. The interface types are not all the same. The network apparatus is stored with at least one weight table, wherein each of the at least one weight table is associated with a network service condition. The network service condition may be construed as a factor that might affect the data/signal transmission of a network service in the heterogeneous network system. For example, the network service condition may be associated with one of a service type, network property, type of a source device, and combination thereof but is not limited thereto. Regarding the meaning of the service type, the network property, and the type of a source device, the details have been described in the aforesaid first embodiment. Hence, they are not repeated herein.

In the rendezvous path selection method, step S301 is firstly executed to measure at least one first transmission parameter by the network apparatus, wherein each of the at least one first transmission parameter is associated with transmission from one of the at least one transceiving interface of the network apparatus to one of the at least one neighboring network apparatus. Through step S301, local transmission parameters are obtained by the network apparatus. Next, step S303 is executed to transmit each of the at least one first transmission parameter by the network apparatus.

In this embodiment, step S301 and step S303 are repeatedly (e.g., periodically) executed so that each of the network apparatuses can update the transmission parameters timely to make the path costs subsequently calculated more accurate. However, it shall be appreciated that the number of times that the steps S301 and S303 are executed in the rendezvous path selection method is not limited in the present invention as long as the step S301 is executed at least once. It shall be further appreciated that the step S303 may be omitted in other embodiments if the partner network apparatuses can calculate the path costs without having to use the at least one first transmission parameter.

The rendezvous path selection method also executes step S305 for receiving a plurality of second transmission parameters by the network apparatus. Each of the second transmission parameters is associated with transmission from a first network apparatus to a second network apparatus neighboring to the first network apparatus. Each of the first network apparatuses is one of the partner network apparatuses, while each of the second network apparatuses is one of the partner network apparatuses and the network apparatus. Through step S305, global transmission parameters are obtained by the network apparatus. In this embodiment, step S305 is repeatedly (e.g., periodically) executed so that each of the network apparatuses can update the transmission parameters timely to make the path costs subsequently calculated more accurate. However, it shall be appreciated that the number of times that the step S305 is executed in the rendezvous path selection method is not limited in the present invention as long as the step S305 is executed at least once.

Step S306 is executed to select one of the at least one weight table as the selected weight table by the network apparatus. It shall be appreciated that the method in which the selected weight table is selected in the step S306 is not limited in the present invention. For example, a selected weight table may be selected in the step S306 according to a signal inputted from a user via an input interface. It shall be further appreciated that the time point at which the step S306 is executed by the network apparatus is not limited in the present invention as long as the weight table is selected before calculating the path cost of each of the paths. In other words, in the rendezvous path selection method, the time point at which the step S306 is executed may be early than the time points at which the step S301 and/or the step S305 are executed in other embodiments.

Step S307 is executed to enumerate a plurality of paths towards a target network apparatus by the network apparatus, wherein the target network apparatus is one of the partner network apparatuses. It shall be appreciated that in some embodiments, the paths may be determined according to a hop count in the step S307. For example, the paths from the network apparatus to the target network apparatus may be enumerated in step S307 according to a hop count value of 2 so that the hop counts involved in the enumerated paths are not greater than 2. Thereafter, step S309 is executed to calculate the path cost of each of the paths by the network apparatus according to the selected weight table and at least a portion of a combination of the at least one first transmission parameter and the second transmission parameters.

In some embodiments, each of the at least one weight table stored in a network apparatus comprises a plurality of weight settings. In these embodiments, another step (not shown) will be executed in the rendezvous path selection method to select at least one of the weight settings as at least one selected weight setting by the network apparatus. For example, the rendezvous path selection method may determine the network service condition involved in a network service that is currently performing (or is going to perform) data/signal transmission on the heterogeneous network system and then select the at least one selected weight setting accordingly. Moreover, in these embodiments, the step S309 is to calculate the path cost of each of the paths by the network apparatus according to the at least one selected weight setting of the selected weight table and at least a portion of a combination of the first and second transmission parameters.

In some embodiments, each of the aforesaid weight settings may further comprise a plurality of weight values and each of the at least one first and second transmission parameters may further comprise a plurality of sub-parameters. Each of the sub-parameters corresponds to one of the weight values. For example, the plurality of weight values comprised in each of the weight settings may comprise the weight value of the RTT, the weight value of the available bandwidth, and the weight value of the QoS. As another example, the plurality of sub-parameters comprised in each of the at least one first transmission parameter and second transmission parameters may comprise the RTT, the available bandwidth, and the QoS.

In these embodiments, the step S309 is to calculate the path cost of each of the paths according to these correspondence relationships. It shall be appreciated that when each of the weight settings comprises a plurality of weight values, the weight values of each of the weight settings have a sum and the sums may be or may not be all the same. If the sums of the weight values comprised in each of the weight settings are unequal, it is intended to distinguish different service types and improve the service quality. If the sums of the weight values comprised in each of the weight settings are equal, it is intended to improve the fairness of scheduling.

In some embodiments, each of the paths comprises at least one link, each of the links has a link transmission parameter, and each of the link transmission parameters is one of the at least one first and second transmission parameters. In these embodiments, each of the path costs is calculated in the step S309 according to the weight values of the at least one selected weight setting and the at least one link transmission parameter corresponding to the at least one link comprised in each of the paths. Then, in the rendezvous path selection method, a transmission path from the network apparatus to the target network apparatus can be determined (e.g., a path corresponding to the lowest path cost is selected) according to the path costs calculated in the step S309.

It shall be appreciated that in some embodiments of the present invention, yet another step (not shown) may be executed in the rendezvous path selection method to dynamically update each of the weight values in each of the at least one weight table stored in the network apparatus. For example, the administrator of the heterogeneous network system may input the desired weight values depending on the network usage condition of the heterogeneous network system and/or his/her preference. Each of the weight values in each of the at least one weight table is dynamically updated according to the weight values inputted by the administrator in this step executed in the rendezvous path selection method. Since the weight tables are updated dynamically, the path cost of each of the paths may also be calculated dynamically in the rendezvous path selection method to further determine whether to update the transmission path or not.

In some embodiments, data for a plurality of network services need to be transmitted in the rendezvous path selection method. The network services may correspond to different target network apparatuses. For each of the network services, the path cost of each of the paths through which the data of the network service is transmitted from the network apparatus to the target network apparatus is calculated in the rendezvous path selection method and then the desired path for subsequent transmission is selected accordingly. It is further determined in the rendezvous path selection method whether to transmit data simultaneously for these network services, or only to transmit data for one or more network services with lower path costs (i.e., with higher transmission priorities) and suspend other network services with higher path costs from transmitting data via the corresponding paths.

In some embodiments, for each of the network services, the path cost of each of the paths may be dynamically (e.g., periodically or aperiodically) calculated in the rendezvous path selection method and then the desired path for subsequent transmission is dynamically selected accordingly. For any of the network services, the paths selected in the rendezvous path selection method at different time points may be different from each other, i.e., paths for data transmission can be dynamically provided in the rendezvous path selection method.

Because the desired path for subsequent transmission can be dynamically decided in the rendezvous path selection method, it can be further dynamically determined whether to transmit data simultaneously for these network services, or only to transmit data for one or more network services with lower path costs. Since the path costs calculated at different time points are different and the network resources at different time points are also different, the transmission of data network services may also be dynamically decided in the rendezvous path selection method. Under this mechanism, if the priority of the network service, of which the data were firstly transmitted by the network apparatus originally, is lowered, then the network apparatus will instead transmit data of the network service with a higher transmission priority.

In addition to the aforesaid steps, the third embodiment can also execute all the operations and steps set forth in the first and the second embodiments, have the same functions and deliver the same technical effects as the first and the second embodiments. The third embodiment has the same functions and deliver the same technical effects as the first and the second embodiments will be readily appreciated by those of ordinary skill in the art based on the explanation of the first and the second embodiments, and thus, will not be further described herein.

The rendezvous path selection method described in the third embodiment may be implemented by a computer program product comprising a plurality of codes. The computer program product may be stored in a non-transitory computer readable storage medium. For the computer program product, when the codes comprised therein are loaded into a network apparatus (e.g., any of the network apparatuses A, B, C, D comprised in the heterogeneous network system 1 of the first embodiment and any of the network apparatuses A, B, C, D comprised in the heterogeneous network system 2 of the second embodiment), the rendezvous path selection method of the second embodiment is executed by the computer program. The non-transitory computer readable storage medium may be an electronic product, e.g., a read only memory (ROM), a flash memory, a floppy disk, a hard disk, a compact disk (CD), a mobile disk, a magnetic tape, a database accessible to networks, or any other storage media with the same function and well known to those of ordinary skill in the art.

It shall be appreciated that in the specification of the present invention, the terms "first" and "second" used in the first transmission parameter and the second transmission parameter are only intended to distinguish these transmission parameters from each other. The terms "first" and "second" used in the first network apparatus and the second network apparatus are only intended to distinguish the network apparatuses from each other.

As can be known from the above descriptions, with the technology provided by the present invention, each of the network apparatuses selects a weight table associated with a network service condition as a selected weight table. Each of the network apparatuses comprised in the heterogeneous network system measures a transmission parameter between the network apparatus and each of the network apparatuses neighboring to the network apparatus, transmits the measured transmission parameters, and receives the transmission parameters transmitted by other network apparatuses. Thus, each of the network apparatuses can obtain not only local transmission information (i.e., the transmission parameters between the network apparatus and the neighboring network apparatuses) but also global transmission information (i.e., the transmission parameters between other network apparatuses). Then, the network apparatus calculates the path cost of each of the paths according to the selected weight table, the local transmission information, and the global transmission information, so accurate path costs can be calculated to select the most appropriate transmission path. Since each of the network apparatuses can calculate a path cost of each of the paths according to the selected weight table, the local transmission information, and the global transmission information, accurate path costs can be calculated to select the most appropriate transmission path.

Moreover, the transmission parameters used in the present invention may comprise a plurality of sub-parameters. The weight table may comprise a plurality of weight settings. Each of the weight settings may comprise a plurality of weight values and each of the transmission parameters corresponds to one of the weight values. Therefore, the users, operators, and applications that are running in the heterogeneous network system may select the desired sub-parameters and selected weight tables depending on the status of the heterogeneous network system or depending on their preferences to achieve a higher network utilization ratio.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A network apparatus for use in a heterogeneous network system, the heterogeneous network system comprising the network apparatus and a plurality of partner network apparatuses, the network apparatus comprising:
   a storage unit, being stored with at least one weight table, wherein the at least one weight table is associated with a network service condition;
   at least one transceiving interface, wherein the at least one transceiving interface has an interface type, is directly connected to at least one neighboring network apparatus, measures at least one first transmission parameter, and receives a plurality of second transmission parameters, wherein the at least one neighboring network apparatus is one of the partner network apparatuses, the at least one first transmission parameter is associated with transmission from one of the at least one transceiving interface to one of the at least one neighboring network apparatus, the second transmission parameters is associated with transmission from a first network apparatus to a second network apparatus neighboring the first network apparatus, the first network apparatuses is one of the partner network apparatuses, and the second network apparatuses is one of the partner network apparatuses and the network apparatus; and a processor, being electrically connected to the storage unit and the at least one transceiving interface and configured to select one of the at least one weight table as a selected weight table, enumerate a plurality of paths from the network apparatus to a target network apparatus, and calculate a path cost for each of the plurality of paths according to the selected weight table and at least a portion of a combination of the at least one first transmission parameter and the second transmission parameters, wherein the target network apparatus is one of the partner network apparatuses;

wherein the plurality of partner network apparatuses comprises at least one partner transceiving interface and the at least one partner transceiving interface has an interface type, and wherein the interface types are not all the same.

2. The network apparatus of claim 1, wherein the at least one network service condition is associated with one of a service type, a network property, a type of a source device, and a combination thereof.

3. The network apparatus of claim 1, wherein the selected weight table comprises a plurality of weight settings, the processor further selects at least one of the weight settings as at least one selected weight setting, wherein the path cost for each of the paths is calculated according to the at least one selected weight setting and at least a portion of a combination of the at least one first transmission parameter and the second transmission parameters.

4. The network apparatus of claim 3, wherein each of the weight settings comprises a plurality of weight values, the weight values of each of the weight settings have a sum, and the sums are not all the same.

5. The network apparatus of claim 3, wherein the at least one selected weight setting comprises a plurality of weight values, the at least one first transmission parameter and the second transmission parameters comprises a plurality of sub-parameters, and each of the sub-parameters corresponds to one of the weight values.

6. The network apparatus of claim 1, wherein the at least one first transmission parameter comprises one of a round trip time, an available bandwidth, a Quality of Service (QoS) parameter, and a combination thereof, and each of the second transmission parameters comprises one of a round trip time, an available bandwidth, a QoS parameter, and a combination thereof.

7. The network apparatus of claim 5, wherein each of the paths comprises at least one link, the at least one link has a link transmission parameter, the link transmission parameter is one of the at least one first transmission parameter and the second transmission parameter, and each of the path costs is calculated according to the weight values of the at least one selected weight setting and the at least one link transmission parameter corresponding to the at least one link comprised in each of the paths.

8. The network apparatus of claim 1, wherein the processor further assigns a network service to use a first path of the paths and the processor further assigns the network service to use a second path of the paths instead of the first path after calculating the path costs.

9. The network apparatus of claim 1, wherein the processor further assigns a first network service to use a first path of the paths, assigns a second network service to use a second path of the paths, determines that the path cost of the first path is lower than the path cost of the second path, enables the first network service to transmit data via the first path, and temporarily suspends the second network service from transmitting data via the second path.

10. The network apparatus of claim 1, wherein the processor further updates the at least one weight table dynamically.

11. A rendezvous path selection method for a network apparatus, a heterogeneous network system comprising the network apparatus and a plurality of partner network apparatuses, the network apparatuses comprising at least one transceiving interface, the at least one transceiving interface being directly connected to at least one neighboring network apparatus, the at least one neighboring network apparatus being one of the partner network apparatuses, the network apparatus being stored with at least one weight table, the at least one weight table being associated with a network service condition, the rendezvous path selection method comprising:

(a) measuring at least one first transmission parameter, wherein the at least one first transmission parameter is associated with transmission from one of the at least one transceiving interface to one of the at least one neighboring network apparatus;

(b) receiving a plurality of second transmission parameters, wherein each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus;

(c) selecting one of the at least one weight table as a selected weight table;

(d) enumerating a plurality of paths from the network apparatus to a target network apparatus; and (e) calculating a path cost for each of the paths according to the selected weight table and at least a portion of a combination of the at least one first transmission parameter and the second transmission parameters, wherein the target network apparatus is one of the partner network apparatuses;

wherein each of the partner network apparatuses comprises at least one partner transceiving interface and each of the partner transceiving interfaces has an interface type; and wherein the interface types are not all the same.

12. The rendezvous path selection method of claim 11, wherein the at least one network service condition is associated with one of a service type, a network property, a type of a source device, and a combination thereof.

13. The rendezvous path selection method of claim 11, wherein the selected weight table comprises a plurality of weight settings, the rendezvous path selection method further comprising:

selecting at least one of the weight settings as at least one selected weight setting;

wherein the step (e) calculates the path cost for each of the paths according to the at least one selected weight setting and at least a portion of a combination of the at least one first transmission parameter and the second transmission parameters.

14. The rendezvous path selection method of claim 12, wherein each of the weight settings comprises a plurality of weight values, the weight values of each of the weight settings have a sum, and the sums are not all the same.

15. The rendezvous path selection method of claim 12, wherein the at least one selected weight setting comprises a plurality of weight values, the at least one first transmission parameter and the second transmission parameters comprises a plurality of sub-parameters, and each of the sub-parameters corresponds to one of the weight values.

16. The rendezvous path selection method of claim 11, wherein the at least one first transmission parameter comprises one of a round trip time, an available bandwidth, a QoS parameter, and a combination thereof and each of the second transmission parameters comprises one of a round trip time, an available bandwidth, a QoS parameter, and a combination thereof.

17. The rendezvous path selection method of claim 14, wherein each of the paths comprises at least one link, each of the links has a link transmission parameter, each of the link transmission parameters is one of the at least one first transmission parameter and the second transmission parameters, and the step (e) calculates each of the path costs according to the weight values of the at least one selected weight setting and the at least one link transmission parameter corresponding to the at least one link comprised in each of the paths.

18. The rendezvous path selection method of claim 11, further comprising:
    assigning a network service to use a first path of the paths; and
    assigning the network service to use a second path of the paths instead of the first path after calculating the path costs.

19. The rendezvous path selection method of claim 11, further comprising:
    assigning a first network service to use a first path of the paths;
    assigning a second network service to use a second path of the paths;
    determining that the path cost of the first path is lower than the path cost of the second path;
    the first network service transmitting data via the first path; and
    temporarily suspending the second network service from transmitting data via the second path.

20. The rendezvous path selection method of claim 11, further comprising updating the at least one weight table dynamically.

21. A heterogeneous network system, comprising:
    a plurality of partner network apparatuses; and
    a network apparatus, being stored with at least one weight table, the at least one weight table being associated with a network service condition, the network apparatus comprising at least one transceiving interface, wherein the at least one transceiving interface is directly connected to at least one neighboring network apparatus, measures at least one first transmission parameter, and receives a plurality of second transmission parameters, wherein the at least one neighboring network apparatus is one of the partner network apparatuses, the at least one first transmission parameter is associated with transmission from one of the at least one transceiving interface to one of the at least one neighboring network apparatus, each of the second transmission parameters is associated with transmission from a first network apparatus to a second network apparatus neighboring the first network apparatus, each of the first network apparatuses is one of the partner network apparatuses, and each of the second network apparatuses is one of the partner network apparatuses and the network apparatus;
    wherein the network apparatus further selects one of the at least one weight table as a selected weight table, enumerates a plurality of paths from the network apparatus to a target network apparatus, and calculates a path cost for each of the paths according to the selected weight table and at least a portion of a combination of the at least one first transmission parameter and the second transmission parameters, wherein the target network apparatus is one of the partner network apparatuses;
    wherein each of the partner network apparatuses comprises at least one partner transceiving interface and each of the partner transceiving interfaces has an interface type; and
    wherein the interface types are not all the same.

* * * * *